April 21, 1964 G. E. McLAUGHLIN 3,130,266

DIFFERENTIAL DEMODULATOR

Filed Aug. 24, 1962

INVENTOR
G. E. Mc LAUGHLIN
BY John K. Mullarney
ATTORNEY 3,130,266

DIFFERENTIAL DEMODULATOR

George E. McLaughlin, Florham Park, N.J., assignor to Bell Telephone Laboratories, Incorporated, New York, N.Y., a corporation of New York Filed Aug. 24, 1962, Ser. No. 219,207
10 Claims. (Cl. 178—6)

Figures 1, 2:
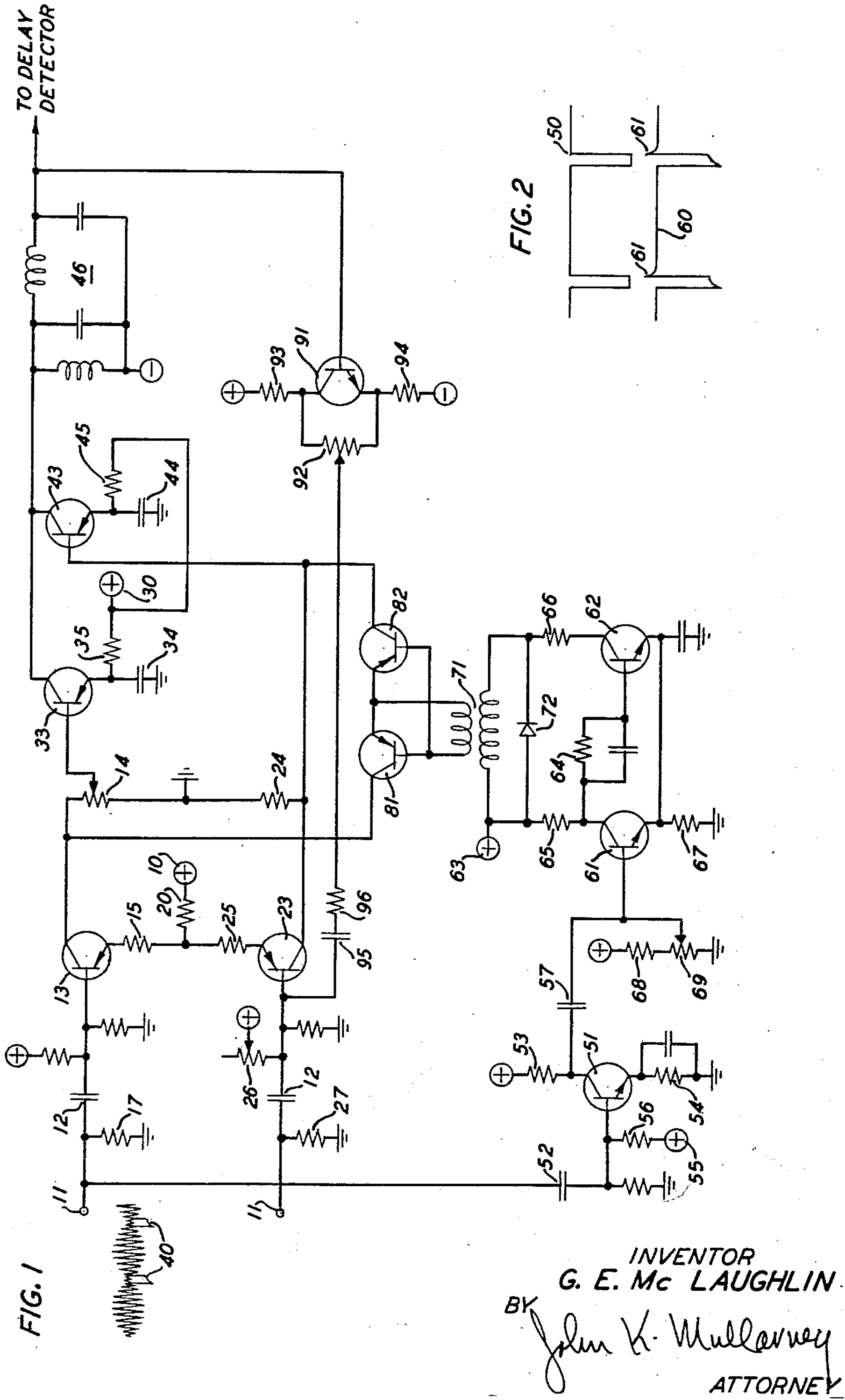

The present invention relates to a differential demodulator for producing desired intermodulation components of impressed waves while suppressing undesired wave components and noise.

A particular use to which the present invention has been put, and therefore the context in which it will be described herein, is as a receiving demodulator in a transmission measuring set. As will be clear hereinafter, however, the invention is in no way limited to this use and it may be employed in other and different radio and electronic systems.

In various types of signal transmitting systems wherein the signals consist of components of different frequencies, it is important that the transmission medium be such that components in the received signal are in the same relative phase relation as in the original signal wave. To avoid distortion, the delay in transmission must be the same for all frequencies, or in other words, any phase shift produced in the signal by the transmission medium must be directly proportional to frequency. This is particularly true in television transmission, for example, since a delay distortion of even one millionth of a second will result in excessive blurring of the image on a television receiver screen. Unfortunately, the actual transmission characteristics of most transmission media depart from the ideal. However, corrective apparatus can be inserted in a given transmission circuit to compensate for the distortion phenomena exhibited thereby, but before such compensation can be provided, it is, of course, necessary that the amount of distortion be known accurately.

A perfect transmission circuit has a phase characteristic which is linear with frequency. Delay is defined as the slope of the phase curve, and it is the variations from linear phase or constant delay which causes transmission impairment. Now, as has been proposed heretofore, the slope of the phase curve can be determined by transmitting two separate frequencies simultaneously over the transmission circuit, the separation of the two frequencies being called the "interval frequency." If these two signals are swept over the frequency range of interest keeping their frequency difference constant, changes in the slope of the aforementioned phase curve will appear as changes in the phase of the received interval frequency.

In the recovery of the interval frequency at the receiver through intermodulation of the pair of swept frequencies, it is necessary to achieve a high degree of suppression of noise and other undesired wave components or the same will show up as delay distortion and thereby impair the measurement of the delay distortion introduced by the transmission circuit under test.

An object of the present invention, therefore, is to produce intermodulation between input waves of different frequencies while suppressing to a high degree in the output circuit undesired wave components and noise.

Another object of the invention is to provide a relatively simple, yet reliable and practicable transistor circuit for performing the above-recited intermodulation and suppression functions.

Television transmission circuits conventionally employ "clampers" (sometimes known as D.-C. restorers) that are structurally and functionally similar to those found in the typical television receiver. Accordingly, when a television transmission circuit is to be tested in the manner described hereinbefore, it is necessary to insert pulses in the swept "twin-tone" test signal. These pulses correspond to the horizontal synchronization (i.e., sync) pulses that comprise part of the standard television signal. However, when these pseudo-sync pulses are present in the incoming test signal, the receiver of the measuring set becomes vulnerable to low frequency noise such as 60 cycles and the like.

As will be clear hereinafter, the fundamental of the added sync pulse signal is of necessity either equal to or at the least subharmonically related to the aforementioned interval frequency. Thus, this sync pulse signal and low frequency noise, for example 60 cycles, will form sum and difference products in the demodulator which are indiscernible from the derived interval frequency and hence from the wanted information.

Accordingly, it is an object of the invention to permit an accurate measurement of the delay distortion of a television transmission circuit in the presence of low frequency noise.

A further object is to recover the interval frequency of a composite twin-tone test signal while eliminating low frequency noise and other undesired wave components.

These and other objects are attained in accordance with the present invention wherein a pair of transistors are connected in common emitter configuration with their collectors directly interconnected to form a "square-law" detector. The received test signal is coupled to the input of the detector via a balanced amplifier stage which is capable of converting an unbalanced or balanced input to a balanced output. With the pair of transistors biased for class-A operation and with balanced input signals applied to the bases thereof, second-order effects will be emphasized, i.e., even harmonics will be accentuated and odd harmonics suppressed. In particular the difference frequency between the two swept frequencies (i.e., the interval frequency) will be prominent in the detector output. This is selected by a narrow bandpass filter which follows the detector.

When pseudo-sync pulses are present in the incoming test signal, however, the receiver becomes vulnerable since undesired wave components resulting therefrom are not readily eliminated by filtering. For example, if the fundamental of the sync pulse signal is equal to the interval frequency the intermodulation of the same with low frequency noise will form sum and difference products which are indiscernible from the derived interval frequency. Nevertheless, these undesired wave components can be eliminated in accordance with the invention through the complete cancellation of the sync pulse fundamental before the same is presented to the detector. This cancellation is based on the realization that any input signal incorporating any given amount of phase shift can be resolved into two components in phase quadrature.

To effect the aforementioned cancellation, the sync pulses in the composite input test signal are coupled to a sync gate circuit which serves to short the balanced outputs of the balanced amplifier stage for the duration of each sync pulse period. This sync gate operation, however, will not eliminate the quadrature component of the sync pulse fundamental.

The removal of this quadrature component is accomplished in accordance with the invention by feeding back a cancellation signal which is 180 degrees out of phase with the same. However, unlike conventional feedback circuits and balancing schemes wherein the signal fed back to the input is derived from the signal to be cancelled, the signal fed back here is primarily derived from the desired distortion measuring signal (i.e., the interval frequency), which for the case assumed is equal to the sync pulse fundamental. In this manner a more complete cancellation of the sync pulse fundamental can be obtained.

The interval frequency produced by the square-law detector is recovered by the bandpass filter, which is also designed to provide a 90 degree phase shift. The signal from this filter is delivered to a feedback transistor stage whose gain may be varied from 0 to plus or minus 1. The output of this transistor is then returned to the input of the balanced amplifier stage to cancel completely the afore-mentioned quadrature component.

Other objects and various features of the invention will be more readily understood from the following detailed description taken in conjunction with the accompanying drawing in which:

FIG. 1 is a schematic circuit diagram of a transistorized differential demodulator constructed in accordance with the present invention; and FIG. 2 shows wave forms useful in the explanation of the invention.

Referring now to FIG. 1 of the drawings, the test signal after traversing the transmission circuit under test is applied to the input terminals 11 of the measuring set receiver. The differential demodulator of the present invention comprises a part of said receiver and it is interconnected between terminals 11 and the delay detecting and measuring units (not shown) of the receiver. The demodulator serves to derive the heretofore described interval frequency while suppressing other unwanted wave components.

The input terminals 11 are coupled via capacitors 12 to the base electrodes of p-n-p transistors 13 and 23. These transistors with their associated load resistors 14 and 24 form a conventional balanced amplifier which is capable of converting an unbalanced or balanced input to a balanced output. The emitters of transistors 13 and 23 are interconnected via a pair of equal resistances 15 and 25, the latter being unbypassed so as to provide some local degeneration for purposes of stability. Forward bias for these transistors is provided by the connection of the junction of resistances 15 and 25 to the direct current biasing source 10 via the resistance 20. The variable resistance 26 permits direct current balancing of the amplifier.

As will be clear to those familiar with the art, with the amplifier balanced the applied test signal results in a pair of substantially equal amplitude, out-of-phase signals at the collector electrodes of transistors 13 and 23. Transistors 13 and 23 operate in a linear manner at all times, resulting in constant input impedances. The resistances 17 and 27 are selected to provide a match between the amplifier input impedance and the transmission circuit impedance.

The square-law detector consists of p-n-p transistors 33 and 43 whose inputs are driven balanced. To this end, the base electrodes of transistors 33 and 43 are respectively connected to the collectors of transistors 13 and 23, with the variable tap on resistance 14 serving to permit an exact balancing of the A.C. gains. The collector electrodes of transistors 33 and 43 are tied together, while the emitter electrodes of the same are A.C. grounded by means of bypass capacitors 34 and 44. Forward bias for the transistors 33 and 43 is provided by connecting the emitters thereof to the direct current biasing source 30 via resistances 35 and 45, respectively.

With the transistors 33 and 43 biased for class-A operation and with a balanced input applied to the bases thereof, the circuit functions as a square-law detector. In such a detector, second-order effects are emphasized, that is, even harmonics are accentuated and odd harmonics are suppressed. The detector output includes second harmonics of each frequency component of the applied signal and sum and difference frequencies formed by every possible combination of frequencies contained in the input signal or signals; see "Radio Engineering" by Terman, McGraw-Hill Book Co., Inc. (1947), pages 515–517. Accordingly, the pair of swept frequency signals that comprise part of the input test signal are intermodulated in the detector to produce a difference or interval frequency at the output thereof. It is the phase modulation on this difference frequency that is directly related to the delay distortion of the transmission circuit over which the test signal is sent.

A conventional L-C type bandpass filter 46 is connected to the output of the detector for the purpose of selecting the interval frequency. The filter rejects the undesired second harmonics that appear in the detector output, as well as any residual even harmonics of the input frequencies. However, as will be clear hereinafter, the pseudo-sync pulses that appear in the composite test signal intermodulate in the square-law detector with low frequency noise to thereby form sum and difference products which are indiscernible from the derived interval frequency and hence cannot be readily eliminated by filtering.

Considering now in greater detail the nature of the composite twin-tone test signal, a symbolic representation of the same is shown at the input of the demodulator of FIG. 1. This test signal comprises two separate signals which are continuously and successively swept over the frequency range of interest (e.g., 10 kc. to 300 kc.) keeping their frequency difference (e.g., 5.6 kc.) constant. The pair of swept frequency signals, of course, "beat" together and thereby form a series of alternate maxima and minima such as illustrated in the waveform of FIG. 1, the beat occurring at a rate equal to the difference frequency, or 5.6 kc.

Now for reasons given hereinbefore, when a television transmission circuit is to be tested, it is necessary to insert sync pulses into the test signal. These sync pulses are designated by reference numeral 40 in FIG. 1. To insure a minimum of interference with the twin-tone test signal the sync pulses are inserted at the nodes or null points of the latter. Accordingly, with a sync pulse at each null point, the fundamental of the sync pulse signal will be 5.6 kc., which is the same as the desired interval frequency. The fundamental of the sync pulse signal does not itself appear in the output of the square-law detector because of the described mode of operation of the same, but the fundamental does intermodulate in the detector with low frequency noise (e.g., 60 cycles) to form sum and difference products (5.6 kc. $\pm$ 60 cycles) which are indiscernible from the desired interval frequency.

As with other nonsinusoidal periodic waves, the sync pulse signal is composed of a fundamental sine wave and higher order harmonics thereof. Accordingly, the undesired intermodulation of the sync pulse signal with low frequency noise is not eliminated by simply changing the sync pulse rate. For example, if sync pulses are inserted at every other null, the fundamental of this sync pulse signal is 2.8 kc. The second harmonic component, however, is 5.6 kc. and the intermodulation of the same with low frequency noise will therefore result in an interfering signal at the detector output.

The above-described unwanted intermodulation wave components are eliminated in accordance with the invention through the complete cancellation of the sync pulse fundamental, or higher order harmonic as the case may be, before the same is presented to the detector. This cancellation is complicated, however, by the fact that the interfering 5.6 kc. component of the sync pulse signal will, in all likelihood, be differentially phase shifted in some fashion with respect to the other wave components that comprise the sync pulse signal. The effect of such a phase shift in the fundamental, for example, is illustrated in FIG. 2 of the drawing. Waveform 50 represents a typical sync pulse signal prior to incorporation of the same in the twin-tone test signal, and waveform 60 represents a sync pulse signal that has suffered distortion as a result of the fundamental being phase shifted some amount with respect to the other wave components thereof. Accordingly, it should be clear that eliminating the sync pulse, by blanking during the sync pulse period for example, will not eliminate all of the interfering 5.6 kc. component; specifically, the portions 61 of the waveform 60 cannot be eliminated by blanking.

The cancellation accomplished herein is based on the realization that any input signal incorporating any given amount of phase shift ($\delta$) can be resolved into two components in phase quadrature. That is:

$$k \sin (\theta+\delta)=p \sin \theta+q \cos \theta$$

Thus, if $k \sin (\theta+\delta)$ represents the interfering phase shifted 5.6 component of the sync pulse signal, the in-phase component ($p \sin \theta$) and the component that is in phase quadrature ($q \cos \theta$) can be separately eliminated to thereby completely eliminate the interfering 5.6 kc. component.

The sync pulses 40 and the 5.6 kc. in-phase component thereof are eliminated by means of a sync gate circuit comprising n-p-n transistors 51, 61 and 62. To this end, the sync pulses 40 are coupled to the base of transistor 51 via the capacitor 52. The pulses are then amplified an amount determined by the ratio of resistances 53 and 54. Also, since this stage is connected in a common emitter configuration, the input pulses are inverted and appear as positive-going pulses at the collector. Forward bias is provided by the direct current biasing source 55 which is connected to the base via resistance 56.

The transistors 61 and 62 are connected in a typical Schmitt trigger circuit configuration. The transistor 62 is normally held in saturation through the connection of its base to the positive direct current biasing source 63, via resistances 64 and 65. Resistances 66 and 67 determine the saturated current and hence the emitter potential of transistor 61. The base potential of transistor 61 is fixed by resistance 68 and the setting of the tap on resistance 69. This latter control is set such that only the tips of the sync pulses overcome the back-bias on transistor 61.

A positive-going pulse applied to the base of transistor 61 through capacitor 57 causes the Schmitt trigger to regenerate in typical fashion and hence a pulse of current appears in the primary winding of transformer 71. The shunt diode 72 serves to damp out unwanted transients. One end of the secondary of transformer 71 is connected to the base electrodes of transistors 81 and 82, while the other end is connected to the emitters of the latter. The pulse of current in the primary generates an output pulse in the secondary which serves to forward bias the emitter-base junctions of transistors 81 and 82. The collector-emitter paths of transistors 81 and 82 comprise a series connection which shunts the collectors of transistors 13 and 23. Accordingly, when the transistors 81 and 82 are temporarily forward biased in the described manner the balanced outputs of the input amplifier are shorted together. When no pulse is present, the transistors 81 and 82 have no bias applied thereto and therefore are effectively open. Thus, in the foregoing manner, the sync gate circuit serves to short-out the balanced output of the balanced amplifier stage for the duration of each sync pulse period.

The removal of the quadrature 5.6 kc. component is accomplished by feeding back a 5.6 signal out of phase therewith. This feedback, however, differs from conventional feedback circuits and balancing schemes in that the signal fed back to the input for balancing or cancellation purposes is not derived from the signal to be cancelled, but rather primarily from the delay distortion measuring signals after demodulation, that is from the interval frequency. And unlike the typical negative feedback arrangement wherein the unwanted signal can never be eliminated completely, the instant feedback arrangement permits a complete cancellation of the quadrature 5.6 kc. component.

The bandpass filter 46 that follows the detector is designed to provide a 90° phase shift. The output of this filter is connected to the base of the transistor 91 in the feedback path. An output from the transistor can be taken from its emitter or collector or any intermediate position by means of the wiper arm of potentiometer 92. Resistances 93 and 94 are gain determining resistances and they are chosen so as to permit the gain to be varied, by the wiper arm, from 0 to plus or minus 1. Thus, with the wiper arm in one extreme position, the feedback stage appears as a common emitter and thereby provides phase inversion. In the other extreme position of the wiper arm, this feedback stage appears as a common collector with no phase inversion. This feedback stage is necessary since the differential phase shift experienced by the 5.6 kc. component of the sync pulse signal can be in either direction (i.e., it can be retarded or advanced with respect to the other wave components).

The wiper arm of the potentiometer 92 is connected to one of the inputs of the balanced amplifier via the capacitor 95 and resistance 96. Capacitor 95 serves to block direct current flow, and resistance 96 is for impedance matching purposes. The adjustment of the wiper arm of potentiometer 92 permits complete cancellation of the quadrature 5.6 kc. component of the sync pulse signal, which in turn eliminates the interference caused by low frequency noise.

The various frequency values recited in the specification (e.g., an interval frequency of 5.6 kc.) are only by way of example and it should be clear that the invention is in no way limited thereto. Similarly, the transistor types shown in the drawing are merely by way of illustration, it being clear to those in the art that p-n-p transistors can generally be substituted for n-p-n transistors and vice versa with due regard, of course, to the polarities of the direct current potential sources. It is to be understood therefore that the foregoing disclosure relates to only a preferred embodiment of the invention and that numerous modifications or alterations may be made therein without departing from the spirit and scope of the invention.

What is claimed is:

1. A differential demodulator comprising a pair of transistors of similar conductivity type each having an emitter, a collector and a base electrode, said transistors being connected in common emitter configuration with their collector electrodes interconnected, means for correspondingly biasing said transistors for class-A operation, a pair of input terminals adapted to be connected to a transmission circuit, and a balanced amplifier interconnected between said pair of input terminals and the base electrodes of said pair of transistors for respectively coupling to the latter substantially equal amplitude out-of-phase signals in response to an input signal at said input terminals.

2. In a system for measuring the delay distortion of a television transmission circuit by transmitting thereover a composite twin-tone test signal which consists of a pair of swept frequency signals having a constant frequency difference therebetween and a sync pulse signal comprising a series of pulses inserted at predetermined points in the twin-tone signal, a square-law detector comprising a pair of transistors of similar conductivity type each having an emitter, a collector and a base electrode, said transistors being connected in common emitter configuration with their collector electrodes interconnected, means for correspondingly biasing said transistors for class-A operation, a pair of test signal input terminals for connection to the transmission circuit under test, a balanced amplifier interconnected between said pair of input terminals and the base electrodes of said pair of transistors for respectively coupling to the latter substantially equal amplitude out-of-phase signals in response to a test signal received at said input terminals, and means for eliminating from the input to said detector the sync pulses including that wave component of the same that is equal in frequency to the aforementioned frequency difference.

3. The combination as defined in claim 2 including a narrow bandpass filter coupled to the output of the square-law detector for selectively passing the difference frequency derived by the latter.

4. In a system for measuring the delay distortion of a television transmission circuit by transmitting thereover a composite twin-tone test signal which consists of a pair of swept frequency signals having a constant frequency difference therebetween and a sync pulse signal comprising a series of pulses inserted at predetermined points in the twin-tone signal, square-law detection means, input means for connection to the transmission circuit under test, balanced amplifier means intercoupling said input means and said detection means for delivering to the latter substantially equal amplitude out-of-phase signals in response to a test signal received at said input means, and means for eliminating from the input to said detection means at least that wave component of the sync pulse signal that approaches in frequency the aforementioned frequency difference, said eliminating means comprising a sync gate circuit operative in response to received sync pulses to short together the balanced outputs of the balanced amplifier means for the duration of each sync pulse period, said eliminating means further comprising a feedback circuit intercoupling the output of said detecting means and the input of said balanced amplifier means for feeding back to the input of the latter a portion of the difference frequency signal that is produced by the square-law detection means.

5. In a system for measuring the delay distortion of a television transmission circuit by transmitting thereover a composite twin-tone test signal which consists of a pair of swept frequency signals having a constant frequency difference therebetween and a sync pulse signal comprising a series of pulses inserted at predetermined points in the twin-tone signal, square-law detection means, input means for connection to the transmission circuit under test, balanced amplifier means intercoupling said input means and said detection means for delivering to the latter substantially equal amplitude out-of-phase signals in response to a test signal received at said input means, a narrow bandpass filter connected to the output of the square-law detection means for selectively passing the difference frequency derived by the latter, sync gate means operative in response to sync pulses in the received test signal to short together the balanced output of the balanced amplifier means for the duration of each sync pulse period to thereby eliminate said sync pulses including the in-phase component of that wave component of the sync pulse signal that equals in frequency the said difference frequency, and feedback means intercoupled between the output of said filter and the input of said balanced amplifier means for feeding back to the input of the latter a cancellation signal that is out-of-phase with the phase quadrature component, if any, of said wave component.

6. The combination as defined in claim 5 wherein said cancellation signal is primarily derived from the difference frequency derived by the square-law detection means.

7. The combination as defined in claim 6 wherein said filter provides a 90° phase shift to the signals passed thereby, and said feedback means includes means for controlling the amplitude of the signal fed back and for selectively inverting the phase of the same.

8. In a system for measuring the delay distortion of a television transmission circuit by transmitting thereover a composite twin-tone test signal which consists of a pair of swept-frequency signals having a constant frequency difference therebetween and a sync pulse signal comprising a series of pulses inserted at predetermined points in the twin-tone signal, a square-law detector comprising a pair of transistors of similar conductivity type each having an emitter, a collector and a base electrode, said transistors being connected in common emitter configuration with their collector electrodes interconnected, means for correspondingly biasing said transistors for class-A operation, a pair of test signal input terminals for connection to the transmission circuit under test, a balanced amplifier interconnected between said pair of input terminals and the base electrodes of said pair of transistors for coupling to the latter substantially equal amplitude out-of-phase signals in response to a test signal received at said input terminals, a narrow bandpass filter connected to the output of the square-law detector for selectively passing the difference frequency derived thereby, sync gate means operative in response to sync pulses in the received test signal to short together the balanced outputs of the balanced amplifier for the duration of each sync pulse period to thereby eliminate said sync pulses including the in-phase component of that wave component of the sync pulse signal that equals in frequency the said difference frequency, and means intercoupled between the output of said filter and the input of said balanced amplifier for feeding back to the amplifier input a cancellation signal that is out-of-phase with the other phase quadrature component of said wave component.

9. The combination as defined in claim 8 wherein said cancellation signal is primarily derived from the difference frequency derived by the square-law detector.

10. The combination as defined in claim 9 wherein said filter provides a 90° phase shift to the signals passed thereby, and said feedback means includes means for controlling the amplitude of the signal fed back and for selectively inverting the phase of the same.

No references cited.